United States Patent [19]

Ueba

[11] Patent Number: 4,575,188

[45] Date of Patent: Mar. 11, 1986

[54] HEAT RESISTANT PLASTIC OPTICAL FIBER

[75] Inventor: Yoshinobu Ueba, Osaka, Japan

[73] Assignee: Sumitomo Electric Industries, Ltd., Osaka, Japan

[21] Appl. No.: 484,042

[22] Filed: Apr. 11, 1983

[30] Foreign Application Priority Data

Apr. 12, 1982 [JP] Japan .................................. 57-61287

[51] Int. Cl.[4] ............................................. G02B 5/172
[52] U.S. Cl. ................................................. 350/96.34
[58] Field of Search ............... 350/96.23, 96.29, 96.30, 350/96.31, 96.33, 96.34; 428/373, 374, 394

[56] References Cited

U.S. PATENT DOCUMENTS

| | | | |
|---|---|---|---|
| 3,993,834 | 11/1976 | Chimura et al. | 350/96.34 X |
| 3,999,834 | 12/1976 | Ohtomo et al. | 350/96.34 |
| 4,138,194 | 2/1979 | Beasley et al. | 350/96.30 |
| 4,213,672 | 7/1980 | Aulich et al. | 350/96.33 |
| 4,458,986 | 7/1984 | Yuto et al. | 350/96.33 |

FOREIGN PATENT DOCUMENTS

| | | | |
|---|---|---|---|
| 34736 | 3/1976 | Japan | 350/96.34 |
| 8321 | 2/1981 | Japan | 350/96.34 |
| 1037498 | 7/1966 | United Kingdom | 350/96.34 |

Primary Examiner—William L. Sikes
Assistant Examiner—Frank González
Attorney, Agent, or Firm—Sughrue, Mion, Zinn, Macpeak and Seas

[57] ABSTRACT

A heat resistant plastic optical fiber having a three component structure of a core, a cladding and a sheath, wherein the core material comprises an amorphous transparent polymer, the cladding material comprises a transparent polymer having a refractive index lower than that of the core material, and the sheath material comprises a resin which is hardenable by irradiation with ultraviolet rays.

6 Claims, No Drawings

HEAT RESISTANT PLASTIC OPTICAL FIBER

FIELD OF THE INVENTION

This invention relates to a plastic optical fiber having a three component structure of a core, a cladding and a sheath having excellent heat resistance.

BACKGROUND OF THE INVENTION

Conventional optical fibers that transmit light are fabricated from quartz glass and plastics. Optical fibers produced from quartz glass have excellent light transmission property and are currently used for long-distance communications. Plastic optical fibers are inferior to quartz optical fibers in terms of light transmission property, but because of their high flexibility, light weight and good processability, their application in short-distance communication light guides or sensors is being studied.

Some applications of plastic optical fibers require high heat-resistance. For example, optical fibers used in an automobile optical data link system are required to withstand temperatures as high as 100° to 120° C. due to the heat from an engine compartment. However, conventional plastic optical fibers comprise a core of polystyrene or polymethyl methacrylate and, therefore, their maximum use temperature limit is as low as about 80° C. At temperatures higher than 80° C., these optical fibers comprising a polystyrene or polymethyl methacrylate core shrink and their light transmission property decreases, and at even higher temperatures, i.e., 100° C. or more, these optical fibers further shrink and may break to make light transmission impossible.

In order to minimize such thermal shrinkage during use, plastic fibers are sometimes previously subjected to heat treatment. Though this heat treatment is effective in reducing the heat shrinkage of the fibers during use, the fibers themselves are no longer flexible and easily break due to vibration or bending, and thus lacking practicability.

It is considered that when plastic optical fibers are continuously used at temperatures as high as 80° C. or more, they not only shrink by heat but also are susceptible to deterioration by oxidation. Oxidation of fibers lowers the light transmission property due to formation of a chemical bond that absorbs light. Therefore, the outer layer of plastic optical fiber is coated with a resin having a small percent oxygen transmission in order to prevent deterioration of fibers by oxidation as described in Japanese Patent Application (OPI) No. 162704/81 (the term "OPI" as used herein refers to a "published unexamined Japanese patent application") and Japanese Utility Model Application (OPI) No. 170407/81. Resins having a low oxygen transmission disclosed therein include those resins which can be coated by melt-extrusion, such as polyamide, a saponification product of an ethylene-vinyl acetate copolymer (EVA), ethylene-vinyl alcohol copolymer, polyvinylidene chloride, polyvinylidene fluoride, etc. However, in order to coat such a thermoplastic resin by melt-extrusion, the extrusion must usually be conducted at temperatures as high as 200° C. or more. Extrusion at high temperatures gives rise to problems such that the plastic optical fiber under the coating layer is extended by heat or the boundary surfaces of the fiber, core and cladding have non-uniform structures due to heating and cooling, resulting in increase of the transmission loss. These problems frequently arise particularly in obtaining a thick coating layer of the thermoplastic resin and, therefore, the extruded coating layer only has a thickness of about 50 μm at most.

Further, the above-described plastic optical fibers coated with a thermoplastic resin have improved heat shrinkability at 80° to 100° C. as compared with non-coated plastic optical fibers, but they greatly shrink similarly to non-coated fibers at temperatures as high as 120° C. or more, resulting in significant deterioration of flexibility and light transmission property.

SUMMARY OF THE INVENTION

The present invention has been accomplished as a result of intensive investigations to overcome the above-described disadvantages in thermal characteristics of conventional plastic optical fibers.

This invention relates to a heat resistant plastic optical fiber having a three component structure comprising an amorphous transparent polymer as a core material, a transparent polymer having a lower refractive index than that of the core material as a cladding material, and a resin which is hardenable by irradiation with ultraviolet rays (hereinafter referred to as UV-hardenable resin) as a sheath material.

DETAILED DESCRIPTION OF THE INVENTION

The plastic optical fiber of the present invention has a three component structure of a core, a cladding and a sheath. Dimensions of the core, cladding and sheath can be arbitrarily selected. For example, plastic optical fibers having a sheath outer diameter of 0.1 to 4 mm can be produced.

The core material that can be used in the present invention comprises an amorphous transparent polymer. Conventionally known amorphous transparent polymers including polystyrene, polymethyl methacrylate, polycarbonate and so forth can be used. Further, polymers of styrene derivatives such as α-methylstyrene, p-t-butylstyrene and p-butylstyrene; polymers of deuterium compounds of these styrene derivatives; polymers of methacrylate derivatives such as ethyl methacrylate, butyl methacrylate, phenyl methacrylate, benzyl methacrylate, p-cyanophenyl methacrylate and isobornyl methacrylate; polymers of deuterium compounds of these methacrylate derivatives; and copolymers of styrene, methyl methacrylate, styrene derivatives and methacrylate derivatives; and the like may also be used as core material. Preferred materials are polymethyl methacrylate and polycarbonate.

The cladding material which can be used in the present invention comprises a transparent polymer having a lower refractive index than the core material used. Examples of such a transparent polymer include, for example, polymers of styrene derivatives with their hydrogen atom being substituted with a fluorine atom; polymers and copolymers of methacrylate derivatives with their hydrogen atom being substituted with a fluorine; fluorine-substituted polycarbonates, polyvinylidene fluoride, vinylidene fluoride-tetrafluoroethylene copolymers having a vinylidene fluoride content of, e.g., 77 mol%, as disclosed in Japanese Patent Publication No. 21660/78, vinylidene fluoride-hexafluoropropylene copolymers, vinylidene fluoride-tetrafluoroethylenehexafluoropropylene terpolymers, silicone resins, ethylene-vinyl acetate copolymers and the like. In addition, the polymers enumerated as core materials may also be used as cladding material by appropriately selecting a combination wherein the refractive index of the cladding material is lower than that of the core material. A preferred material is a vinylidene fluoride-tetrafluoroethylene copolymer.

The sheath material that can be used in the present invention comprises a UV-hardenable resin. UV-hardenable resins include epoxy acrylate-based resins, 1,2-polybutadiene-based resins having an acryl group, thiol-ene type resins and the like.

The plastic optical fiber of the present invention can be produced by melt-spinning a preform consisting of a core and a cladding into a fiber having both a core and a cladding, continuously coating a UV-hardenable resin around the fiber to a desired film thickness, hardening the coated film by passing through an ultraviolet ray-irradiating zone and winding-up. The formation of a core-cladding structure by melt-spinning and the subsequent formation of a sheath from a UV-hardenable resin may not be continuously effected, and it is possible to conduct these steps discontinuously.

It is also possible that, after melt-spinning of a preform of a core, a cladding is coated on the resulting core by a solution method followed by drying to form a core-cladding structure and then a sheath comprising a UV-hardenable resin is formed therearound.

Since the UV-hardenable resin is usually liquid at room temperature, it can be coated by passing a fiber having a structure composed of a core and a cladding through a die filled with the UV-hardenable resin as is well known in the art. Further, if the UV-hardenable resin is highly viscous or solid at room temperature, such a resin may be adjusted so as to have a proper viscosity for coating by heating the die.

The UV-hardenable resin does not contain volatile components that are unfavorable for coating film formation and, therefore, a sheath having a film thickness of 0.05 to 0.5 mm can be formed in a single coating step. Further, if a thick sheath is desired, the film thickness may be arbitrarily controlled by repeating the coating and the hardening by UV-irradiation.

The fiber on which the UV-hardenable resin has been coated is then passed through an ultraviolet ray-irradiating zone to complete hardening in a very short time.

The plastic optical fiber obtained by the present invention does not shrink at a temperature as low as 80° C. to 100° C. as is the case of conventional plastic optical fibers, withstands use for extended periods of time and does not undergo loss of light transmission.

Further, shrinkage of the plastic optical fiber of the invention at high temperatures, i.e., 100° to 120° C. or even higher, can be minimized and the light transmission property can be maintained for long periods of time.

Furthermore, the plastic optical fiber of the present invention does not lose its function as a light transmission pass due to shrinkage or deformation even when exposed in a high temperature atmosphere as 120° C. or more, while conventional fibers undergo heat-shrinkage and at the same time deformation in an extremely short time to lose their function as a light transmission pass and cannot be used any more. Such a characteristic of the plastic optical fiber of the invention cannot be seen in any conventional optical fibers and is of great value from practical and industrial standpoints.

The present invention will now be described in greater detail by reference to the following examples, but these examples are not to be understood to limit the present invention.

EXAMPLE 1

A fiber having a core-cladding structure and a cladding outer diameter of 0.495 mm (cladding thickness: 0.020 mm) was prepared from polymethyl methacrylate as a core material and a vinylidene fluoride-tetrafluoroethylene copolymer as a cladding material. A thiol-ene type UV-hardenable resin (SPR 123-WE-7, a trade name produced by W. R. Grace Co., Ltd.) was coated on the resulting fiber at room temperature using a die. Immediately thereafter, the coated fiber was passed through an ultraviolet ray-irradiating zone provided with three 1 kw high pressure mercury lamps at a distance of 10 cm away from the light sources, thereby to form a plastic optical fiber having a core-cladding-sheath structure. The resulting fiber had an outer diameter of 0.735 mm and a sheath thickness of 0.120 mm. In forming the sheath of the UV-hardenable resin, changes in structure of the core and cladding portion, i.e., change of boundary surface between core and cladding or changes in core diameter were not observed at all.

When the thus obtained fiber was cut in 100 mm length and subjected to heat-treatment at 100° C. for 60 minutes, the shrinkage was 1% or less.

The resulting fiber was tested for temperature dependency of the transmitted light intensity, and it was found that no reduction in light intensity was observed up to 135° C.

COMPARATIVE EXAMPLE 1

A plastic optical fiber having a core-cladding structure (outer diameter: 0.495 mm; cladding thickness: 0.020 mm) produced from polymethyl methacrylate as a core material and a vinylidene fluoride-tetrafluoroethylene copolymer as a cladding material was tested for temperature dependency of the transmitted light intensity, and it was found that the light intensity began to greatly reduce from 100° C. and, at 120° C. reduced to 50% or less the intensity at room temperature and that the shrinkage of the fiber after keeping at 100° C. for 60 minutes and at 120° C. for 60 minutes were 5% and 40% or more, respectively.

COMPARATIVE EXAMPLE 2

A plastic optical fiber having a core-cladding structure (outer diameter: 0.495 mm; cladding thickness: 0.020 mm) produced from polymethyl methacrylate as a core material and a vinylidene fluoride-tetrafluoroethylene copolymer as a cladding material was coated with a thermoplastic polyamide resin by melt-extrusion to form a sheath having a thickness of about 0.1 mm. However, because of a high extrusion temperature as 200° C. or more and high resin viscosity, break of the core, cladding or fiber and change of the outer diameter were observed and a satisfactory fiber could not be obtained.

COMPARATIVE EXAMPLE 3

In the same manner as described in Comparative Example 2, a sheat of about 0.1 mm thickness was formed by using a thermoplastic resin that can be melt-extruded at a low temperature, i.e., ethylene-vinyl acetate copolymer.

The heat shrinkage of the resulting fiber having a core-cladding-sheath structure and temperature dependency of the transmitted light intensity were not so different from the results of Comparative Example 1.

EXAMPLE 2

A plastic optical fiber having a core-cladding-sheath structure was produced in the same manner as described in Example 1 but using an acrylate type resin as a UV-hardenable resin (SM-40, a trade name produced by Dyna Chem. Co., Ltd.). The resulting fiber had an outer diameter of 0.615 mm and a sheath thickness of 0.060 mm.

No structural change of the core and cladding portion was observed at all in the resulting fiber. Tests for temperature dependency of the transmitted light intensity revealed that no reduction of light intensity was observed up to 130° C. The shrinkage after heat treatment at 100° C. for 60 minutes was 1% or less.

EXAMPLE 3

In the same manner as described in Example 1, a thiol-ene type UV-hardenable resin (SPR 2311, a trade name produced by W. R. Grace Co., Ltd.) was coated on a fiber having a core-cladding structure produced from polycarbonate as a core material and a vinylidene fluoride-tetrafluoroethylene copolymer as a cladding material (outer diameter: 0.45 mm; cladding thickness: 0.025 mm) and hardened to produce a plastic optical fiber having a core-cladding-sheath structure having an outer diameter of 0.75 mm and a sheath thickness of 0.125 mm.

The resulting fiber was uniform in the structure of core and cladding portion. No heat shrinkage occurred at 100° C. and 120° C., and the shrinkage after keeping at 140° C. for 60 minutes was 1% or less. The temperature dependency of the transmitted light intensity was extremely small and reduction in light intensity was not observed at all at a temperature of 180° C. or less.

While the invention has been described in detail and with reference to specific embodiments thereof, it will be apparent to one skilled in the art that various changes and modifications can be made therein without departing from the spirit and scope thereof.

What is claimed is:

1. A heat resistant plastic optical fiber having a three component structure of a core, a cladding and a sheath, wherein the core material comprises an amorphous transparent polymer, the cladding material comprises a transparent polymer having a refractive index lower than that of the core material, and the sheath material comprises a resin which is hardenable by irradiation with ultraviolet rays and is selected from the group consisting of epoxy acrylate-based resins, 1,2-polybutadiene-based resins having an acryl group and thiol-ene type resins.

2. The heat resistant plastic optical fiber as claimed in claim 1, wherein the amorphous transparent polymer is a polymer selected from the group consisting of polystyrene, polymethyl methacrylate, polycarbonate, polymers of styrene derivatives selected from α-methylstyrene, p-phenylstyrene and p-t-butylstyrene, polymers of deuterium compounds of these styrene derivatives, polymers of methacrylate derivatives selected from ethyl methacrylate, butyl methacrylate, phenyl methacrylate, benzyl methacrylate, p-cyanophenyl methacrylate and isobornyl methacrylate, polymers of deuterium compounds of these methacrylate derivatives and copolymers of styrene, methyl methacrylate, styrene derivatives and methacrylate derivatives.

3. The heat resistant plastic optical fiber as claimed in claim 1, wherein the transparent polymer used as a cladding material is a polymer selected from the group consisting of polymers of styrene derivatives with their hydrogen atom being substituted with a fluorine atom, polymers of methacrylate derivatives with their hydrogen atom being substituted with a fluorine atom, copolymers of these methacrylate derivatives, fluorine-substituted polycarbonate, polyvinylidene fluoride, vinylidene fluoride-tetrafluoroethylene copolymers, vinylidene fluoride-hexafluoropropylene copolymers, vinylidene fluoride-tetrafluoroethylenehexafluoropropylene terpolymers, silicone resins and ethylene-vinyl acetate copolymers.

4. The heat resistant plastic optical fiber as claimed in claim 1, wherein the amorphous transparent polymer used as a core material is polymethyl methacrylate, the transparent polymer used as a cladding material is a vinylidene fluoride-tetrafluoroethylene copolymer, and the resin which is hardenable by irradiation with ultraviolet rays is a thiol-ene type resin.

5. The heat resistant plastic optical fiber as claimed in claim 1, wherein the amorphous transparent polymer used as a core material is polymethyl methacrylate, the transparent polymer used as a cladding material is a vinylidene fluoride-tetrafluoroethylene copolymer, and the resin which is hardenable by irradiation with ultraviolet rays is an epoxy acrylate-based resin.

6. The heat resistant plastic optical fiber as claimed in claim 1, wherein the amorphous transparent polymer used as a core material is a polycarbonate, the transparent polymer used as a cladding material is a vinylidene fluoride-tetrafluoroethylene copolymer, and the resin which is hardenable by irradiation with ultraviolet rays is a thiol-ene type resin.

* * * * *